Oct. 20, 1959 W. C. FREHSE 2,908,949
HONEYCOMB PLASTIC DOOR GASKET
Filed Nov. 12, 1957

INVENTOR
Walter C. Frehse
BY McCoy, Greene & LeGrotenhuis
ATTORNEYS

United States Patent Office 2,908,949
Patented Oct. 20, 1959

2,908,949

HONEYCOMB PLASTIC DOOR GASKET

Walter C. Frehse, Wabash, Ind., assignor to The General Tire & Rubber Company, Akron, Ohio, a corporation of Ohio Application November 12, 1957, Serial No. 695,968

5 Claims. (Cl. 20—69)

The present invention relates to an improved sealing strip or gasket for use on abutting structures such as refrigerator doors and the like.

Sealing strips having a central hollow portion make excellent gaskets for refrigerator doors and the like because the central hollow forms an insulating dead air space about the door and gives a certain resilience to the seal. This compressible resilient structure permits a large surface width of the sealing strip to flatten against the frame surface so as to provide an adequate seal therewith.

A persistent drawback to sealing strips of this construction, however, is the fact that the central hollow portion takes on a permanent set and thereby loses much of its sealing effectiveness. This drawback has been accentuated by the substitution of polyvinyl chloride for rubber as the sealing strip material because polyvinyl chloride compounds are not as elastic as rubber compounds. A second drawback is the fact that the central hollow portion tends to collapse to one side or the other because of the wiping action encountered on the hinge side of the door so as to result in an inadequate seal between the door and frame.

It is an object of the present invention to provide a sealing strip having interior hollow portions which provide good resistance to compression and have little tendency to collapse laterally from a wiping action on the hinge side of the box.

It is another object to provide a honeycomb sealing strip with a low percent of permanent set and a high resistance to lateral movement.

It is a further object to provide a honey-comb sealing strip which resists compression without the use of a filler and can be formed easily into satisfactory corner splices.

Other objects, uses, and advantages will become apparent from the following description and claims, and from the drawing in which:

Figure 1:
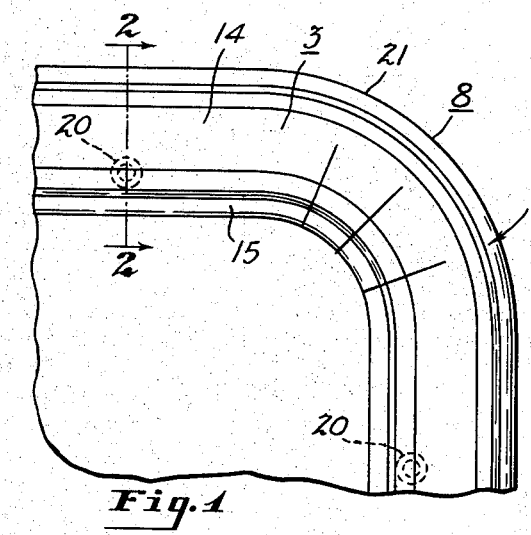
Figure 1 is a fragmentary elevational view of a refrigerator door having a sealing strip of the present invention mounted thereon.
Figure 2:
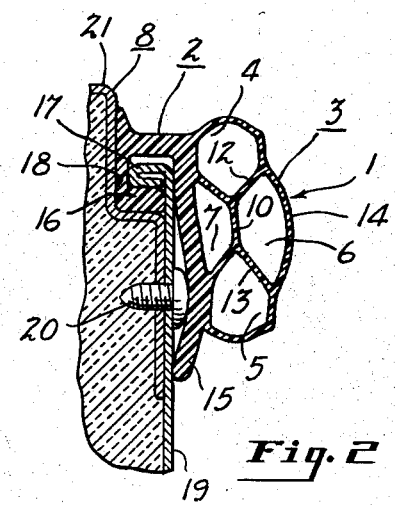
Figure 2 is a sectional view taken along the line indicated at 2—2 in Fig. 1 and on an enlarged scale.
Figure 4:
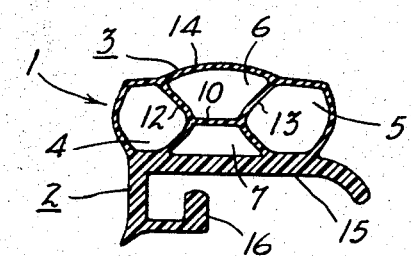
Figure 4 is a sectional elevational view of a sealing strip constructed according to the present invention.
Figure 3:
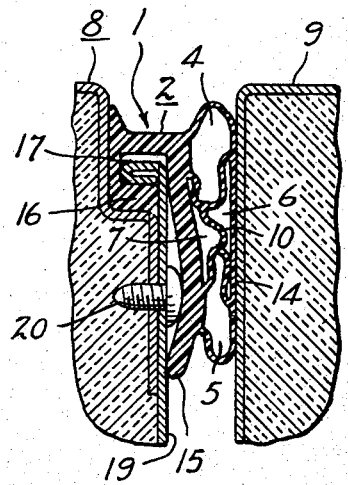
Figure 3 is a sectional elevational view of sealing strip mounted on a refrigerator door and compressed between the door and refrigerator body.

Referring more particularly to the drawings, Figs. 1 and 2 show a sealing strip 1 made of a plasticized polyvinyl chloride composition mounted on a refrigerator door 8. The sealing strip comprises a flat, more or less L-shaped base section 2 and a hollow top section 3 comprising longitudinally-oriented, abutting hollow cells 4, 5, 6 and 7 (Fig. 4). The side or lateral hollow cells 4 and 5 are joined together by an intermediate reinforcing member 10 so as to form central cell 7 between the reinforcing member and the base member and central cell 6 on top or above the reinforcing member. The side or lateral cells 4 and 5 are thus tied together at the middle portion of their inner walls 12 and 13 by connecting member 10 and at the top portion of their inner walls by the outer wall 14 of the cell 6. The upper portion of walls 12 and 13 together with the reinforcing member 10 defines cell 6 and the lower portion of walls 12 and 13 together with the reinforcing member 10 defines cell 7. When the strip is in the sealing position and engaged with closure 9 as shown in Fig. 3, central outer cell 6 is substantially collapsed. Lateral cells 4 and 5 are partially collapsed. The inner cell walls 12 and 13 and connecting member 10 are distorted into S-curve configurations but the central cells 6 and 7 remain centered and the sealing strip itself has no appreciable lateral movement. There is ample hollow space between the door 8 and closure 9 so as to provide effective sealing and heat insulation.

The base portion 2 with which the cells are integral has a flat cell supporting portion 15 which fits against the exposed edge portion of the refrigerator door as shown in Figs. 2 and 3. A flange gripping portion 16 engages the flange 17 of the refrigerator door panel 19. The flange gripping portion of the seal is held tightly between the flange and the inwardly set recessed pocket portion 18 of the door. Screws or other fastening means 20 hold the panel against the door frame 21. Other configurations of the base may be used to conform to other arrangements for holding and positioning the seal in the door such as shown in U.S. Patents Nos. 2,263,381; 2,736,076; 2,642,630; and 2,379,193.

The great majority of present refrigerator seals are made of plasticized polyvinyl chloride due to its low cost and the fact it is easily colored and pigmented. Other pliable polymeric materials and compositions may be used such as copolymers of vinyl chloride and vinyl acetate, polyethylene, polyurethanes, and similar extrudable materials. Various rubbers and rubbery compositions may also be used. One advantage of the present invention however, is that the seal may be made of relatively inelastic and unresilient materials such as plasticized polyvinyl chloride as opposed to rubbers. The central interconnected cellular structure of the present invention provides resilience and resistance to permanent set not otherwise obtained when relatively unresilient materials are used.

The excellent resilience and low permanent set properties are due to the resistance to lateral and collapsing movement which is provided by the multi-cellular structure of the present invention in which lateral or side cells are connected together at their mid-points such as by reinforcing member 10 and at their top such as by upper wall or reinforcing member 14. Both reinforcing members 10 and 14 lie in a plane which is generally parallel to the plane of the base 15.

The upper portion of the supporting walls 12 and 13 diverge at an angle of somewhat less than 90° from the flat base so that the upper portions of the wall will bend laterally outward upon compression of the sealing strip and place the reinforcing member 14 in tension. Likewise, the inner walls 12 and 13 from the mid-portions down diverge outwardly toward the base 15 so as to be U-shaped in cross-section. When the strip is compressed, the lower portions of the walls 12 and 13 collapse inwardly and place the reinforcing member 10 in compression. In this way, the best resistance to movement both parallel and perpendicular to the base portion can be obtained.

Figure 5:
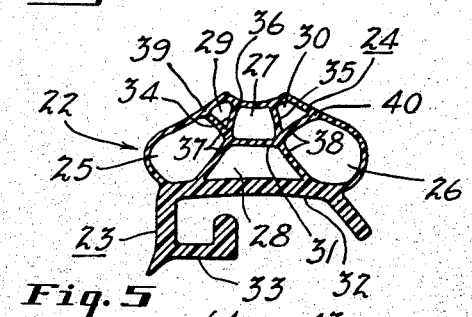
Figure 5 is a sectional elevational view of another embodiment of a sealing strip constructed according to the present invention.

An alternate form of the invention is shown in Fig. 5 in which a sealing strip 22 comprises a base section 23 and a top section 24 having spaced hollow cells 25, 26, 27, 28, 29 and 30 running longitudinally substantially throughout the length of the strip. The hollow cells 25 and 26 are joined together by an intermediate reinforcing member 31 to form a central cell 28 of a nearly trapezoidal shape. The base section 23 has a flat base or cell supporting portion 32 and a flange gripping portion 33. Upper supporting members 34 and 35 which are generally perpendicular to the flat base 32 and rest on intermediate reinforcing member 31 form upper lateral cells 29 and 30 and an upper central cell 27. The upper supporting members are interposed between the reinforcing member 31 and an upper reinforcing member 36 which joins and reinforces the upper portions of lateral cells 25 and 26. Upper reinforcing member 36 forms junctions 39 and 40 with the lateral cells 25 and 26. It is to be noted that when a compressive force is applied to a sealing strip having upper supporting members 34 and 35 as shown, the compressive force on outer wall or upper reinforcing member 36 is transmitted throughout the structure and is resisted by the spring-like action of the entire upper and lower cell structure.

The upper supporting members preferably are inclined away from an angle normal to the flat base so that they may form U curves upon compression of the strip, the center of the U curves being closer to the lateral outer portion of the sealing strip than the end portions of the U curves. Thus each upper supporting member generally binds so that the center of the U curve is pointed toward the nearest juncture of the reinforcing member 36 and one of the lower lateral cells 25 and 26.

When the compressive force is large, the embodiment shown in Fig. 5 is preferred over that shown in Fig. 4 since the sealing strip is supported in three positions substantially parallel to the base and in at least four positions generally perpendicular to the flat base. Also, the intermediate nearly parallel plane of support extends substantially throughout the width of the sealing strip, the intermediate supporting plane being formed by reinforcing member 31 and the upper portions of the inner walls 37 and 38 of the lower lateral cells 25 and 26. It is preferred that the cells 25 and 26 be joined at a point closer to their midportions by the intermediate reinforcing member. The resistance to lateral movement is increased remarkably in this embodiment due to the arrangement of the upper and intermediate reinforcing members.

Figure 6:
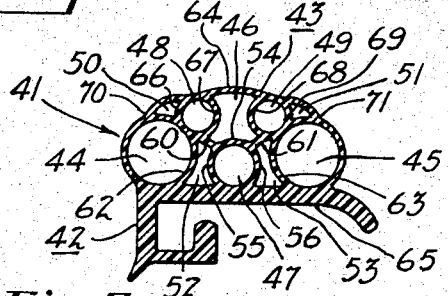
Figure 6 is a sectional elevational view of still another embodiment of a sealing strip constructed according to the present invention.

Still another alternate form of sealing strip is shown in Fig. 6 in which a sealing strip 41 comprises a base section 42 and an upper section 43. The upper section 43 comprises hollow cells 44, 45, 46, 47, 48, 49, 50, 51, 52 and 53. The hollow cells 44, 45, 47 as well as 48 and 49 preferably have generally circular cross sectional areas. Lower cells 44 and 45 are joined together by intermediate reinforcing member 54. The center portion of reinforcing member 54 is supported by lower supporting members 55 and 56 which also form cell 47 and are the inner walls thereof. The lower lateral cells 44 and 45 are thus linked to each other through substantially the middle portions of their inner walls 62 and 63 by means of the intermediate reinforcing member and the lower central cell 47. The lower central cell 47 is also supported on a base layer 65 of the base section 42 and thus forms hollow cells 52 and 53 adjacent the central cell 47. The hollow cells 52 and 53 are of an irregular trapezoidal shape and have upper walls 60 and 61 respectively which also help to form the intermediate reinforcing member 54. Inner walls 66, 67, 68 and 69 of the hollow cells 48 and 49 act as upper supporting members for upper reinforcing member 64 and members 66 and 69 help to form upper cells 50 and 51 which are of nearly wedge shape. The upper cells 50 and 51 are located in the extreme upper lateral section of the sealing strip. The generally circular cross sectional cells 48 and 49 also form upper central cell 46. An upper reinforcing member or outer wall 64 joints and reinforces the lateral cells 44 and 45 through their upper cell portions forming juncture 70 with cell 44 and juncture 71 with cell 45. When a compressive force is applied on the outside or top of the sealing strip, such as on the outer wall 64, the force is immediately resisted by substantially all the upper and lower cells of the sealing strip. The cells and reinforcing members are so arranged that there is no substantial lateral movement even though the compressive force is large. The lateral cells 44 and 45 collapse so as to place the upper reinforcing member 64 in tension and intermediate reinforcing member 54 in compression.

The embodiment shown in Fig. 4 preferably is used where the compressive force is not large and yet substantial resistance to lateral movement is desired. When the compressive force is large and the resistance to lateral movement and low permanent set is desired, the embodiments of Figs. 5 and 6 are preferred.

As heretofore stated the preferred pliable polymeric material of the sealing strip is a flexible polyvinyl chloride composition in which the polyvinyl chloride is plasticized with a monomeric plasticizer such as dioctyl phthalate, dioctyl adipate, and/or a polymeric plasticizer such as polyethylene sebacate. Other compounding ingredients such as pigments, fillers, heat and light stabilizers, antioxidants, and the like may be used in the polymeric composition as is well known in the art.

It is to be understood that in accordance with the provisions of the patent statutes, the particular form of product shown and described and the particular procedure set forth are presented for purposes of explanation and illustration and that modifications of said product and procedure can be made without departing from my invention.

Having described my invention, I claim:

1. An extruded pliable plastic sealing strip comprising a base section and a top sealing section which comprises a plurality of spaced upper and lower cells running continuously longitudinally of the strip and having about the same cross-sectional area throughout their lengths, at least two of said cells being lower cells integrally attached to a flat base of the base section of substantially the same height and cross sectional area, and a reinforcing member generally parallel to the base section joining the lower cells near the midportions thereof to provide support and resistance to lateral movement.

2. An extruded pliable plastic sealing strip comprising a base section and a top sealing section which comprises a plurality of spaced upper and lower cells running continuously longitudinally of the strip and having about the same cross-sectional area throughout their lengths, at least two of said cells being lower cells integrally attached to a flat base of the base section of substantially the same height and cross sectional area, an upper reinforcing member generally parallel to the base section joining the lower cells near their upper portions thereof and an intermediate member generally parallel to the base section joining the lower cells near the midportions thereof to provide support and resistance to lateral movement.

3. An extruded pliable plastic sealing strip comprising a base section, a top section formed of a plurality of spaced hollow tubular cells running continuously longitudinally of the strip and having about the same cross-sectional area throughout their lengths, at least two of which are lower cells integrally attached to a flat base of the base section of substantially the same height and cross-sectional area and at least one of which is an upper cell, at least one intermediate reinforcing member joining the lower base attached cells near the midportions thereof to provide support and resistance to lateral movement, at least one upper reinforcing member generally parallel to the flat base, and at least one upper supporting member joining said intermediate and said upper reinforcing members, said upper reinforcing member joining said base-attached cells at their upper portions.

4. An extruded pliable plastic sealing strip comprising a base section having a flat supporting base and a top sealing section which comprises a plurality of spaced hollow cells running continuously longitudinally of the strip and having about the same cross-sectional area throughout their lengths, at least two of said cells being lower cells attached to and transversely spaced apart on the flat supporting base, at least one central upper cell formed by an intermediate reinforcing member generally parallel to said flat base, and two upper supporting members and an upper wall, said intermediate reinforcing member integrally joined to the lower cells near the midportions thereof.

5. An extruded pliable plastic sealing strip of a plasticized polyvinyl chloride composition comprising a base section having a flat supporting base and a flange gripping portion, and a top section having a plurality of spaced upper and lower hollow cells running continuously longitudinally of the strip and having about the same cross-sectional area throughout their lengths, at least one reinforcing member intermediate and joined to at least two said lower cells near the midportions thereof, at least one upper reinforcing member joining the two said lower cells at their upper portions whereby when a compressive force is exerted on the top section of the sealing strip the upper reinforcing member is put in tension while the intermediate reinforcing member is put in compression.

References Cited in the file of this patent

UNITED STATES PATENTS

| | | |
|---|---|---|
| 2,114,308 | McGowan et al. | Apr. 19, 1938 |
| 2,263,831 | Welch | Nov. 25, 1941 |
| 2,266,703 | Cooper | Dec. 16, 1941 |
| 2,275,235 | Shanklin et al. | Mar. 3, 1942 |
| 2,718,677 | Cornell | Sept. 27, 1955 |